United States Patent [19]

Gardner et al.

[11] Patent Number: 4,755,942

[45] Date of Patent: Jul. 5, 1988

[54] SYSTEM FOR INDICATING WATER STRESS IN CROPS WHICH INHIBITS DATA COLLECTION IF SOLAR INSOLATION EXCEEDS A RANGE FROM AN INITIAL MEASURED VALUE

[75] Inventors: Bronson Gardner, Garfield Heights; Melvin Keener, Chagrin Falls, both of Ohio

[73] Assignee: The Standard Oil Company, Cleveland, Ohio

[21] Appl. No.: 735,798

[22] Filed: May 17, 1985

[51] Int. Cl.$^4$ ...................... G06F 15/20; A01G 25/16
[52] U.S. Cl. .................................................. 364/420
[58] Field of Search ................ 364/420; 374/121, 124; 137/78.2, 79, 80; 239/63, 69, 67; 356/213, 229; 354/410

[56] References Cited

U.S. PATENT DOCUMENTS

| | | | |
|---|---|---|---|
| 3,969,735 | 7/1976 | Nobusawa | 354/444 |
| 4,015,366 | 4/1977 | Hall | 47/1 R |
| 4,060,728 | 11/1977 | Horrocks | 250/328 |
| 4,119,987 | 10/1978 | Beach | 354/268 |
| 4,165,532 | 8/1979 | Kendall et al. | 364/420 |
| 4,176,395 | 11/1979 | Evelyn-Veere et al. | 364/420 |
| 4,182,566 | 1/1980 | O'Reagan | 354/268 |
| 4,197,866 | 4/1980 | Neal | 137/1 |
| 4,209,131 | 6/1980 | Barash et al. | 239/68 |
| 4,209,244 | 6/1980 | Sahara et al. | 354/459 |
| 4,301,682 | 11/1981 | Everest | 374/112 |
| 4,322,805 | 3/1982 | Rog et al. | 364/481 |
| 4,333,490 | 6/1982 | Enter, Sr. | 137/78.3 |
| 4,354,484 | 10/1982 | Malone et al. | 126/425 |
| 4,396,149 | 8/1983 | Hirsch | 239/63 |
| 4,420,265 | 12/1983 | Everest et al. | 374/133 |
| 4,423,484 | 12/1983 | Hamilton | 364/420 |

FOREIGN PATENT DOCUMENTS

| | | |
|---|---|---|
| 8202439 | 7/1982 | Australia . |
| 3238073 | 1/1983 | Fed. Rep. of Germany . |
| 2554313 | 11/1983 | France . |
| 8100764 | 3/1981 | PCT Int'l Appl. .................. 374/133 |

OTHER PUBLICATIONS

The AG 42 Infrared Thermometer sales brochure, Telatemp Corp., 4 pages, data unknown.

"Irrigation Enters the Space Age", Tempe Daily News, Jun. 11, 1979, 3.

Jackson, R. D. et al., "Canopy Temperature as a Crop Water Stress Indicator", Agristars pub. EW-U1-04077; JSC-17133, Mar. 1981.

Scherer, T. F. et al., "Automated Data Collection for Irrigation Scheduling Using Canopy-Air Temperature Difference," American Society of Agricultural Engineers Paper No. 83-2587, Dec. 1983.

(List continued on next page.)

Primary Examiner—Jerry Smith
Assistant Examiner—Clark A. Jablon
Attorney, Agent, or Firm—Joseph G. Curatolo; Larry W. Evans

[57] ABSTRACT

An apparatus and method for indicating whether irrigation of an agricultural crop is required based on the measurement of crop water stress. The apparatus and method include a plurality of sensors for sensing a plurality of conditions related to the agricultural area, including crop canopy and air temperatures, and relative humidity, from which the water stress condition of the crop can be determined, and for generating signals representative of each of the sensed parameters; an electronic device connected to the sensors receiving the sensor signals for determining therefrom the water stress condition of the crop; and an output device connected to the electronic device for visually displaying the calculated water stress index. The apparatus may be embodied in a portable unit that provides immediate analysis of environmental and crop data along with the crop water stress index. To ensure that measurements are taken under generally similar light conditions, an initial solar insolation value is compared to a value measured during each subsequent data collection. The canopy temperature measurement is rejected if insolation is not within a range of the initial value, thereby inhibiting calculation of the crop water stress index.

14 Claims, 4 Drawing Sheets

OTHER PUBLICATIONS

Gardner, B. R., "Plant and Canopy Temperatures in Corn, as Influenced by Differential Moisture Stress", pp. 43–44 (1980), University of Nebraska.

Gardner, B. R., "Techniques for Remotely Monitoring Canopy Development and Estimating Grain Yield of Moisture Stressed Corn", pp. 45–52, 62, 64 (1983) Univ. of Nebraska.

Jackson, R. D. et al., "Crop Temperature Reveals Stress", *Crops and Soils*, vol. 29, No. 8, pp. 10–13, (1977).

European Search Report, EP 86 30 3625, published Jun. 16, 1987, Corresponding to Publication No. 202,847.

Schmugge, T., "Remote Sensing of Soil Moisture with Microwave Radiometers", *Transactions of the ASAE*, pp. 748–753, 1983.

Ehrler et al., "Sorghum Foliar Responses to Changes in Soil Water Content" *Agronomy Journal*, vol. 59, May–Jun. 1967, pp. 243–246.

"Infrared Thermometers Help Pinpoint Irrigation Needs" Apr. 1984, *AG Consultant and Fieldman*, Apr. 1984.

Everest, C. E., "Infrared Thermometry", Landscape West, date unknown.

Idso, S. B. et al., "Remote Sensing for Agricultural Water Management and Crop Yield Prediction", *Agricultural Water Management*, 1 (1977, published (1978) 299–310.

Idso, S. B. et al., "A Generalizatin of the Stress-Degree-Day Concept of Yield Prediction to Accommodate a Diversity of Crops," *Agricultural Meteorology*, 21 (1980) 205–211.

Idso, S. B. et al., "Normalizing the Stress–Degree-Day Parameter for Environmental Variability," *Agricultural Meterology*, 24 (1981) 45–55.

Gardner, B. R. et al., "Plant and Air Temperatures in Differentially Irrigated Corn," *Agricultural Meteorology*, 25 (1981) 207–217.

Gardner, B. R. et al., "Relationship Between Crop Temperature and the Physiological and Phenological Development of Differentially Irrigated Corn," *Agronomy Journal*, 73 (1981) 743–747.

Slack, D. C. et al., "Irrigation Scheduling in Sub-Humid Regions with Infrared Thermometry," American Society of Agricultural Engineers (1981) 116–124.

Clawson, K. L. et al., "Infrared Thermometry for Scheduling Irrigation of Corn," *Agronomy Journal*, 74 (1982) 311–316.

Geiser, K. M. et al., "Irrigation Scheduling Using Crop Canopy-Air Temperature Difference," *Transactions of the ASAE* (1982) 689–694.

Jackson, R. D., "Canopy Temperature and Crop Water Stress", *Advances in Irrigation*, 1 (1982) 43–85.

Keener, M. E. et al., "The Use of Canopy Temperature as an Indicator of Drought Stress in Humid Regions," *Agricultural Meteorology*, 28 (1983) 339–349.

Slack, D. C. et al., "Simplified Irrigation Scheduling Using Canopy-Air Temperature Difference", ASAE paper 83-2126, presented for summer meeting, American Society of Agricultural Engineers, Bozeman, Montana, Jun. 1983.

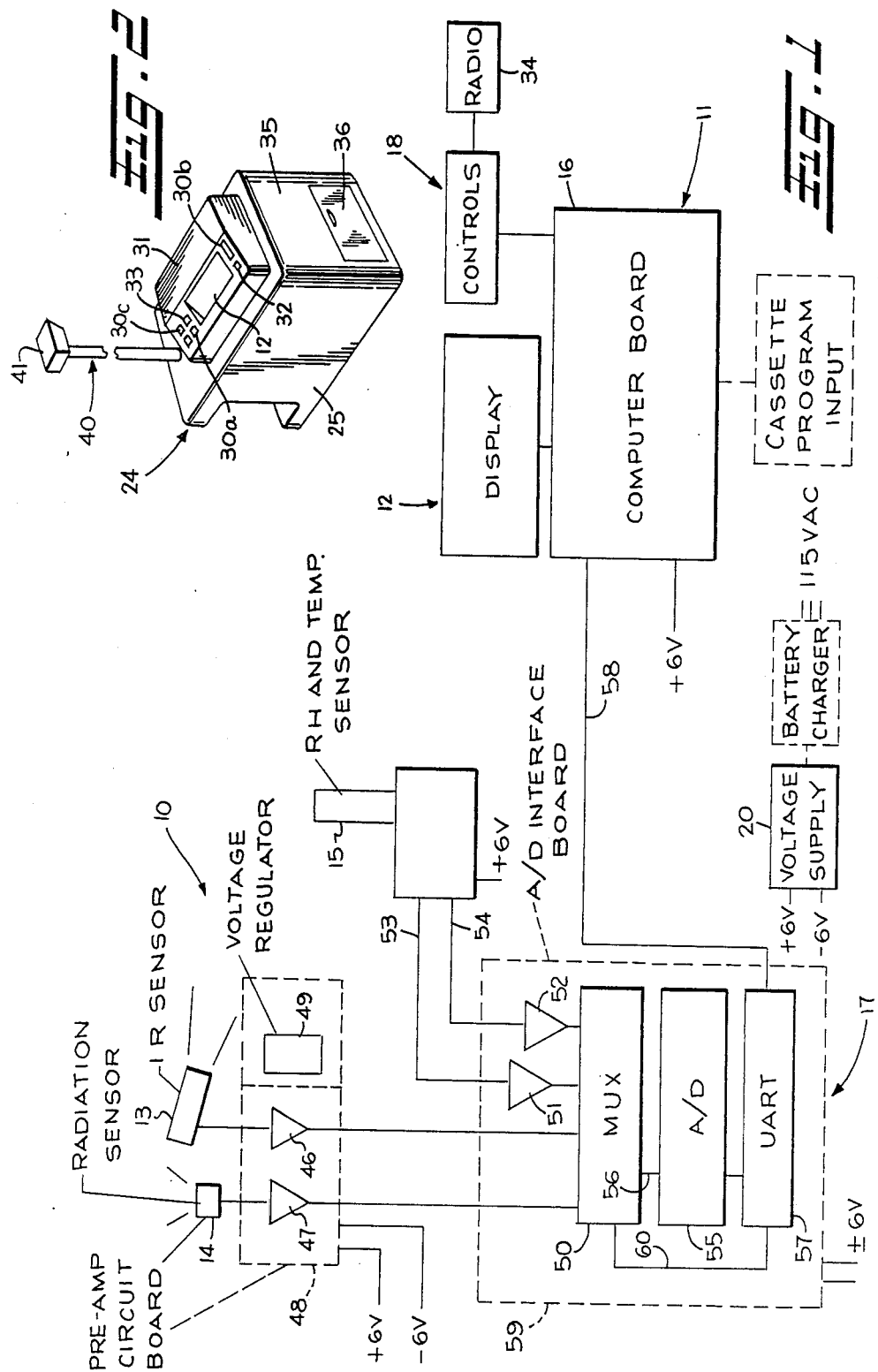

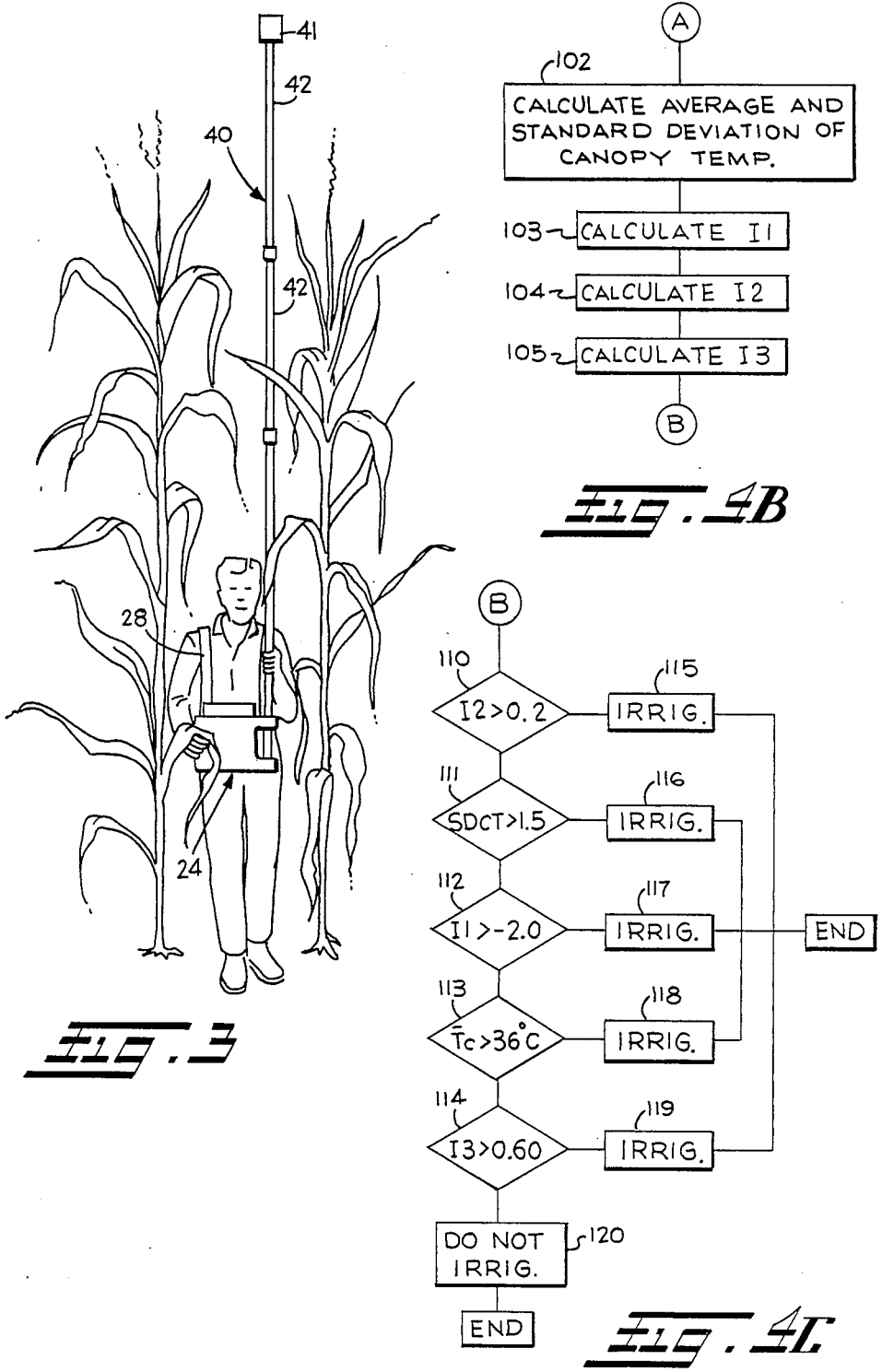

SYSTEM FOR INDICATING WATER STRESS IN CROPS WHICH INHIBITS DATA COLLECTION IF SOLAR INSOLATION EXCEEDS A RANGE FROM AN INITIAL MEASURED VALUE

The invention herein described relates generally to systems and methods for scheduling irrigation of agricultural areas in which crops such as corn and soybean are being grown.

BACKGROUND

Effective scheduling of irrigation is important in modern irrigated agricultural production. Such scheduling is especially important in decisions related to maximizing yields in areas where irrigation water supplies are limited. Even if irrigation water supplies are plentiful, effective irrigation scheduling is needed to make the most efficient use of energy and water while avoiding problems associated, for example, with over-watering such as erosion and leaching.

For many years the scheduling of irrigation of an agricultural area has been performed in a relatively unosphisticated manner such as periodically for a set period of time. Such procedure, however, affords little assurance that the crop is not being damaged by over- or under-watering.

In an effort to provide for more effective and efficient scheduling of irrigation, systems, and methods have been devised which base irrigation scheduling on measurement of physical properties such as soil moisture content, temperature, humidity and water flow. Such systems consequently use one or more probes or sensors to measure such physical properties. In some of these systems, the probes or sensors are connected to an electrical or electronic device such as a microprocessor which effects analysis of the sensed data as by comparison to a given standard. Hence, irrigation might be initiated by such systems when, for example, the soil moisture content falls below a specified level considered to be the minimum soil moisture content for desired production of the crop being grown.

For many years the concept of using canopy temperature to detect the onset and duration of plant water stress has been known (Tanner, 1963; Weigand and Namken, 1966; Ehrler and van Bavel, 1967; Astin and van Bavel, 1972; Bartholic et al, 1972; and Ehrler, 1973). When a leaf is freely transpiring, the cooling properties of the evaporating water keep the leaf temperature below that of the air. When plant water intake becomes deficient as when soil moisture content is low, the heat load of the leaf builds up because convection and thermal radiation are insufficient to dissipate the heat load. Thus, the leaf temperature will approach and often rise above air temperature when soil moisture content is low.

Several researchers have reported theoretical concepts which make use of canopy/air temperature difference in describing the effects of water stress on crop yields. One of these concepts uses only the canopy/air temperature difference (Idso et al, 1977), whereas another also incorporates the vapor pressure deficit (Idso et al, 1981). A third concept adds the radiation load and is based on the energy balance of the leaf (Jackson et al, 1981). These three concepts respectively rely on what has been termed the stress degree day (SDD), the water stress index (WSI) and the crop water stress index (CWSI). The first two indices are empirical simplifications of the third and all three indices were utilized in arid regions. In a later work (Keener and Kircher, 1983), it was shown that in arid environments all three indices appear to work equally well as a describer of yield losses due to water stress whereas only the third index may be useful in describing yield losses in humid environments.

Respecting the scheduling of irrigation, it has been suggested that the SDD index can be utilized to schedule irrigation (Idso et al, 1977). Others also have developed techniques based on canopy temperature to schedule irrigation. As reported in Slack et al (1981) canopy temperatures were used to schedule irrigation of maize in a sub-humid region. In a later paper (Slack et al, 1983), two approaches were investigated as a means of simplifying irrigation scheduling procedures using crop canopy/air temperature difference, one of which involved a hand-held automated instrument package including an infrared thermometer, a net radiometer or pyranometer, and a psychrometer interfaced with a microcomputer for collection and analysis of data.

In Clawson and Blad (1982), it was concluded that canopy temperature variability can be used to signal the onset of plant water stress in maize but that the severity of the stress is better indicated by the magnitude of the elevation of the average canopy temperature above that of a well watered reference plot. Geiser et al (1982) showed that the approach of Slack et al (1981) could reduce the water applied to maize plots (as compared to irrigation scheduling by a checkbook method or resistance blocks (without reducing yields).

Accordingly, a few have used canopy temperatures to schedule irrigation whereas others have alluded to the possibility of using canopy temperature as an irrigation scheduling tool. Generally, the art relating to irrigation scheduling based on canopy temperatures is in its infancy and is begging for more effective, practical and efficient systems and methods for scheduling irrigation.

BACKGROUND LITERATURE

Aston, A. S. and van Bavel, C. H. M., 1972. Soil surface water depletion and leaf temperature. Agron. J., 64:368–373.

Bartholic, J. F., Namken, L. N. and Wiegand, C. L., 1972. Aerial thermoscanner to determine temperatures of soil and of crop canopies differing in drought stress. Agron. J., 64:603–608.

Clawson, K. L. and B. L. Blad, 1982. Scheduling corn irrigation by utilizing infrared thermometry. Agron J. 74:311–316.

Ehrler, W. L., 1973. Cotton leaf temperatures as related to soil water depletion and meteorological factors. Agron. J., 65:404–409.

Ehrler, W. L., and van Bavel, C. H. M., 1967. Sorghum foliage response to changes in soil water content. Agron. J., 59:404–409.

Geiser, K. M., E. R. Allred and D. C. Slack, 1982. Use of crop canopy-air temperature difference for irrigation scheduling. Project completion report. University of Minnesota Agricultural Engineering report series.

Idso, S. B., Reginato, R. J. and Jackson, R. D., 1977. Remote sensing of crop yields. Science, 196:19–75.

Idso, S. B., Reginato, R. J., Hatfield, J. L., Walker, G. K., Jackson, R. D. and Pinter, P. J., Jr., 1980. A generalization of the stress-day-degree concept of yield prediction to accommodate a diversity of crops. Agric. Meteorol., 21:205–211.

Jackson, R. D., Idso, S. B., Reginato, R. J. and Pinter, P. J., Jr., 1981. Canopy temperature as a crop drought stress indicator. Water Resour. Res., 17:1133–1138.

Keener, M. E., and P. L. Kircher, 1983. The use of canopy temperature as an indicator of drought stress in humid regions. Agric. Meteor. 28:339–349.

Slack, D. C., Geiser, K. M., Strange, K. W., and Allred, E. R., 1981. Irrigation scheduling in subhumid regions with infrared thermometry. In: Irrigation Scheduling for Water and Energy Conservation in the 80's. Proc. of ASAE Irrig. Scheduling Conf., Dec. 1981, Am. Soc. Agric. Eng. St. Joseph, MI, pp. 116–124.

Slack, D. C., and Werner, H. D., 1983. Simplified Irrigation Scheduling Using Canopy-Air Temperature Difference. ASAE paper 83-2126. Presented for Summer Meeting, American Society of Agricultural Engineers, Bozeman, Montana, June, 1983.

Tanner, C. B., 1963. Plant temperatures. Agron. J., 55:210–211.

Wiegand, C. L. and Namken, L. N., 1966. Influence of plant moisture stress, solar radiation, and air temperature on cotton leaf temperatures. Agron. J., 58:582–586.

SUMMARY OF THE INVENTION

The present invention provides a novel system and method for scheduling irrigation of an agricultural area which is primarily based on the measurement of actual plant responses to soil water deficits for efficient and effective irrigation. Advantages afforded by the system and method include immediate determination of the need to irrigate, simplicity in operation, reduced time in scheduling of irrigation resulting in labor savings, increased crop yields, and minimization of over-irrigation with resultant decrease in direct and indirect costs.

A primary feature of the subject invention is the controlled collection of data from sensors employed to sense crop canopy temperature and ambient conditions, and the immediate analysis and derivation from such collected data, and output, of irrigation instructions for controlling irrigation of the agricultural area in accordance therewith. According to one aspect of the invention, there is provided a portable system unit which is easy to carry and operate, greatly facilitates the collection of data, and provides immediate irrigation instructions to the operator for prompt implementation of irrigation if indicated. According to another aspect of the invention, a field installable unit is provided which automatically collects data at a predetermined time each day and generates irrigation instructions or commands for controlling irrigation of the field in which it is installed. Generally, however, the system determines the need for irrigation and outputs an instruction based upon such determination.

More particularly, a system and method for scheduling irrigation of an agricultural area in which a crop is being grown, according to the subject invention, are characterized by sensor means for sensing a plurality of parameters related to the agricultural area, including crop canopy temperature, from which the water stress condition of the crop can be determined, and for generating sensor data respectively representative of the sensed parameters; electronic means operatively connected to the sensor means for controllably receiving the sensor data from the sensor means and deriving therefrom irrigation instructions dependent at least in part on a determination from such data of the water stress condition of the crop; and output means operatively connected to the electronic means for outputting such irrigation instructions for controlling irrigation of the agricultural area in accordance therewith. The output means may include a visual display for providing a message to the operator of the system indicating the need to irrigate for indirect implementation of irrigation. Alternatively, the instructing means may comprise suitable control circuitry for automatically initiating operation of irrigation equipment for direct implementation of irrigation.

Further in accordance with the invention, a portable system unit for scheduling irrigation of an agricultural area in which a crop is being grown comprises a housing; plural sensors carried by the housing for sensing respective parameters related to the agricultural area, including crop canopy temperature, from which the water stress condition of the crop can be determined, and for generating sensor data respectively representative of such parameters; electronic means mounted in said housing and operatively connected to the plural sensors for controllably receiving the sensor data from the plural sensors and then deriving therefrom irrigation instructions dependent at least in part on a determination from such data of the water stress condition of the crop; and output means carried by the housing and operatively connected to the electronic means for outputting such irrigation instructions for controlling irrigation of the agricultural area in accordance therewith. The plural sensors include an infrared thermometer preferably elevated above the housing by an adjustable length extension pole. The extension pole may also support at its upper end a solar radiation sensor utilized to sense incident solar radiation. The plural sensors also include a temperature and relative humidity sensor which may be selectively activated and which is preferably mounted within the housing and selectively exposable to outside environmental conditions by a door in the housing which when open activates the temperature and humidity sensor for then sensing ambient air temperature and relative humidity.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a block diagram of an irrigation scheduling system according to the subject invention;

FIG. 2 is a perspective view of a portable system unit according to the subject invention;

FIG. 3 is an elevation view showing usage of the portable system unit in accordance with the invention;

FIGS. 4A–4C are flow charts of a logic sequence carried out by the system in accordance with the subject invention.

DETAILED DESCRIPTION

Figure 4A:
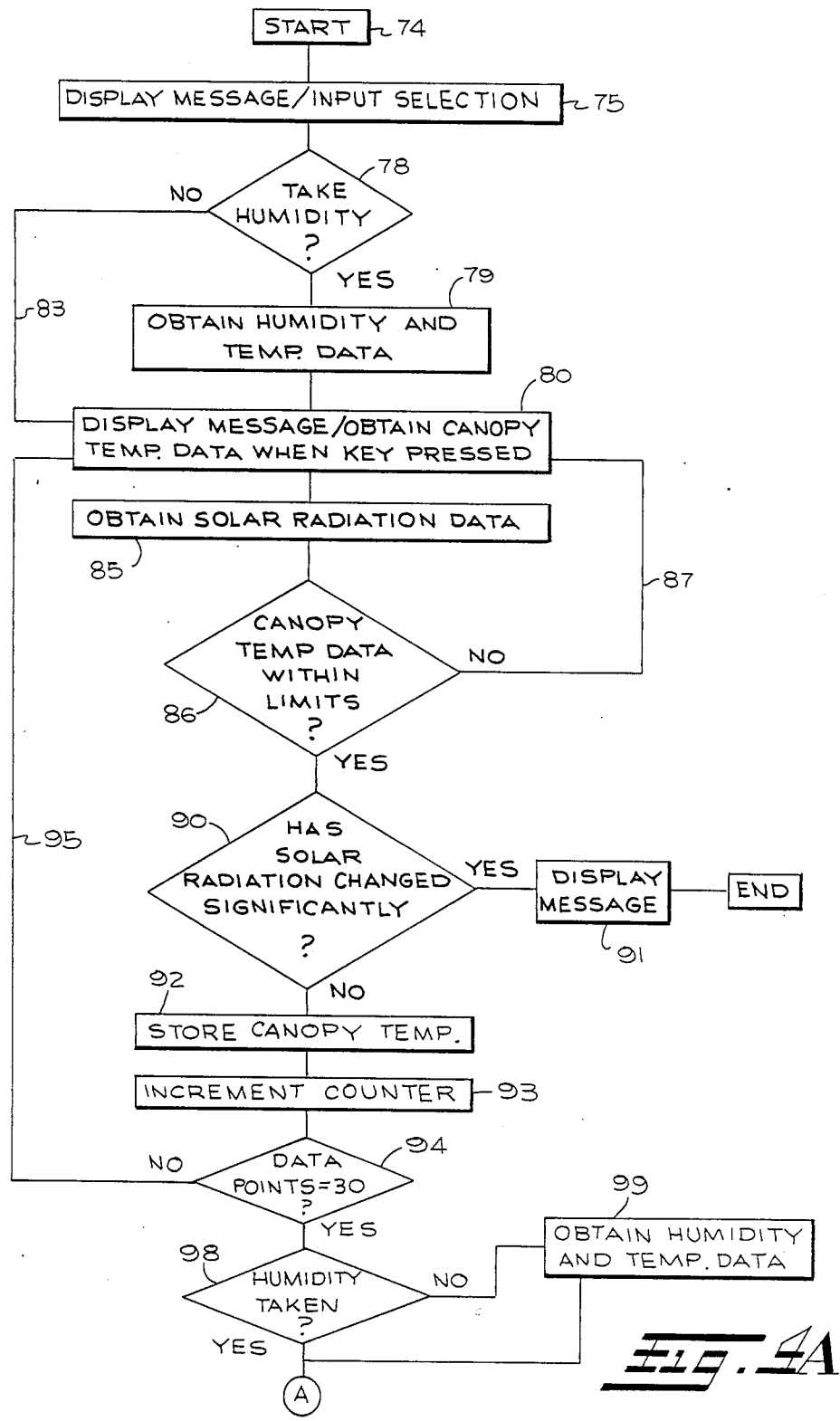

In FIG. 1, an irrigation scheduling system according to the invention can be seen to comprise, generally, a plurality of sensors 10 for sensing canopy temperature of a crop being grown in an agricultural area or field and ambient conditions, an electronic device 11 operatively connected to the sensors for controllably receiving data from such sensors and for then analyzing such data to derive irrigation instructions dependent at least in part on a determination of the water stress condition of the crop, and an output device 12 for outputting the irrigation instructions based upon such analysis which an operator can then use to control irrigation of the agricultural area under consideration. More particularly, the system includes a crop canopy temperature sensor 13, a solar radiation sensor 14 and an air temperature/relative humidity sensor 15. The electronic device II includes a digital device 16, preferably a computer, which is operatively connected to the sensors 13-15 by an analog-to-digital interface 17. The computer 16 is operatively connected to the output device 12 and also an input device 18 for interfacing with the operator. Also provided is a source of electrical power such as a battery 20 for powering the system components.

In accordance with a preferred embodiment of carrying out the invention, the system components are assembled into a portable unit indicated generally at 24 in FIG. 2. The unit 24 includes a housing 25 in which the computer 16, A/D interface 17, input device 18, output device 12 and battery 20 are suitably mounted. As is preferred, the housing is sealed to protect the therein mounted system components from environmental conditions such as rain and dust.

As seen in FIG. 3, the portable unit 24 may be conveniently carried by an operator by means of a strap or harness 28 secured to the housing 25 which frees at least one hand of the operator for pressing the hereinafter discussed keys of the operator input device 18. The unit may be carried in front of the operator as shown or at the operator's side. The strap or harness preferably is adjustable for preferred carrying of the unit at about the operator's waist. However, other means may be used to provide for convenient and easy transporting of the unit 24 through the agricultural area under consideration for the taking of crop canopy temperature measurements at different locations in the agricultural area.

In the illustrated embodiment of the invention, the operator input device 18 includes several keys or buttons 30 provided on the top panel 31 of the housing 25. More particularly, the input device includes a reset key 30a, a canopy temperature key 30b, and an air temperature/humidity key 30c. Also provided is a system on/off key 32 and a radio key 33. The on/off key 32 turns the system on and off whereas the radio key 33 turns on and off a weather band radio, indicated at 34 in FIG. 1, that may be mounted in the housing for preferred inclusion in the overall system.

The output device 12 also is provided on the top panel 31 of the housing 25 for convenient viewing by the operator particularly when the unit 24 is being carried in front of the operator. The output device 12 preferably is a multiple line, liquid crystal display suitably connected to a display output port of the computer 16. The liquid crystal display is preferred over a CRT video device because of its lighter weight, smaller size and relatively low power requirements.

The air/humidity sensor 15 is mounted within the housing 25 and, according to the preferred embodiment of the invention, such sensor 15 is a psychrometer which takes relative humidity measurements from which vapor pressure deficits may be calculated in known manner. Of course, such sensor also directly provides for measurement of ambient air temperature, i.e., the dry bulb temperature. An exemplary psychrometer is a Vaisaln HMP 111A Humicap psychometer.

The psychrometer 15 preferably is mounted adjacent an outer panel of the housing 25, such as the side panel indicated at 35, which is provided with a door 36 for selectively exposing the psychrometer to outside environmental conditions. Preferably, the door 36 has associated therewith a switch which activates the psychrometer when the door is opened by the operator and turns off the psychrometer when the door is closed.

The portable unit 24 also includes an extension pole 40 which is anchored at its lower end in the housing 25. The extension pole 40 has secured to its upper end a mount 41 for the canopy temperature sensor 13 and the solar radiation sensor 14. The purpose of the extension pole is to elevate the canopy temperature sensor and solar radiation sensor above the crop canopy, i.e., to a height greater than the crop being grown in the agricultural area to be irrigated. For use with corn, the extension pole may have a length of about 9 feet which should in most cases be sufficient to locate the canopy temperature sensor and solar radiation sensor above fully grown corn plants. The extension pole also may be adjusted in length, as by adding or removing sections 42 thereof or by telescoping, so that the elevation of the sensors may be progressively increased as the crop canopy increases in height during the growing season.

In the illustrated portable unit 24, the crop canopy temperature sensor 13 is an infrared (IR) thermometer. IR thermometers are well known to the art and an exemplary one is the Everest Interscience Inc. Agri-Therm infrared thermometer. The IR thermometer may be secured within the mount 41 such that its line of view extends at an angle of about 60° to about 70° to the longitudinal extent of the extension pole 40. Accordingly, when the extension pole is held vertically, the IR thermometer will be aimed down at the crop at a desired angle of about 20° to about 30° to the horizon. Respecting proper orientation of the IR thermometer during the taking of a crop canopy temperature measurement in the hereinafter described manner it is important that only crop be viewed by the IR thermometer. During early stages of crop growth, this may necessitate, for example, the taking of crop canopy temperature measurements along a sight line oblique to the rows of plants in the field.

The solar radiation sensor 14 may be a conventional pyranometer such as a Li-Cor Model 200S pyranometer. The pyranometer may be secured atop the mount 41 for unobscured measurement of incident solar radiation.

The extension pole 40 preferably is tubular for internally accommodating electrical wiring connecting the IR thermometer and pyranometer to the system components mounted in the housing 25 and particularly the A/D interface 17. Of course, the electrical wiring may be otherwise located if desired.

Referring again to the system block diagram of FIG. 1, conventional amplifier circuits 46 and 47 are respectively connected to the outputs of the IR thermometer 13 and the pyranometer 14. Such amplifier circuits 46 and 47 may be provided on a common printed circuit board 48 preferably located close to such sensors as in the mount 41 for such sensors for remote transmission of amplified output signals to the A/D interface 17 located in the housing 25. A voltage regulator 49 also may be provided on the board 48 for regulating the voltage powering the IR thermometer and the pyranometer.

The A/D interface 17 includes a conventional multiplexer circuit 50 having two of its inputs respectively connected to the amplified outputs of the IR thermometer 13 and pyranometer 14, respectively. The multiplexer circuit also has two other inputs respectively connected by amplifier circuits 51 and 52 to the relative humidity outputs 53 and 54 of the psychrometer 15, respectively. The output of the multiplexer circuit 50 is connected to the analog input of a conventional analog-to-digital conversion circuit 55 as indicated by the line 56. In turn, the digital output of the A/D circuit 55 is connected to a conventional asynchronous transmission circuit (UART) 57 which is coupled to the computer 16 by an RS-232 serial interface 58. As illustrated, the multiplexer circuit 50, amplifier circuits 51 and 52, A/D circuit 55 and UART 57 may be provided on a common printed circuit board 59 located in the housing 25.

Respecting operation of the A/D interface 17, the asynchronous transmission device 57, in response to a command received from the computer 16 via the RS-232 serial interface 58, supplies corresponding address signals to the multiplexer circuit 50 to select which amplified output of the sensors 13-15 is to be outputted to the A/D circuit 55. Such address signals are supplied via line 60 which represents three address lines sufficient to address each of the four inputs to the multiplexer circuit. The selected analog signal is then converted by the A/D circuit 55 to a digital signal which is transmitted serially to the computer by the asynchronous transmission device via the serial interface. In this manner the computer may controllably select and receive sensor data from any and each of the sensors, which data is representative of the sensed parameter.

In FIGS. 4A-4C a preferred logic sequence or program employed within the computer 16 to accomplish the objectives of the subject invention is shown. The computer preferably is a microcomputer although other control and data processing means could be employed for carrying out the various functions and features of the invention. The logic sequence or program may be stored in read only memory (ROM) or loaded into the computors random access memory (RAM) from a program input device 70 such as a cassette recorder. The system may be used and the logic sequence carried out each day preferably in the afternoon at about 1400 hours to about 1700 hours when crop canopy temperature will generally be at its highest levels.

The logic sequence or program generally operates to control the acquisition of data from the sensors, then to analyze such data, and then to output irrigation instructions, such as recommendations, derived from an analysis of the acquired data which an operator can use immediately to control irrigation of the field under consideration. Accordingly, the program includes a data acquisition sub-program shown in FIG. 4A, a calculation sub-program shown in FIG. 4B and a decision program shown in FIG. 4C.

Referring first to the flow chart of FIG. 4A, the program and more particularly the data acquisition sub-program is initiated at start box 74 as when the system is turned on by pressing the on/off key 32 on the top panel of the unit 24 or when the reset key 30a is pressed at any time during operation of the unit. The program proceeds to input/output box 75 which displays a message on the liquid crystal display 12 instructing the operator to press either the temperature/humidity key 30c or the canopy air temperature key 30b. This gives the operator the option of proceeding directly with the taking of canopy temperature measurements in the field or first taking humidity and air temperature measurements preferably outside the field.

After the operator has entered his input by pressing either the air temperature/humidity key 30c or the canopy temperature key 30b, the program proceeds to decision box 78. If the air temperature/humidity key was pressed, the program proceeds to action box 79 for receipt of humidity and air temperature data from the psychrometer 15. As is preferred, a message is displayed (on the liquid crystal display 12) which instructs the operator to step outside the field under consideration and then open the door 36 for measurement of ambient conditions. When the door 36 is opened, relative humidity data is obtained from the psychrometer and stored as appropriate variables in the computer's memory. From this data, vapor pressure deficit may be calculated in known manner. After such data is received and stored, the program proceeds to input/output box 80 for the taking of crop canopy temperature measurements.

Returning to decision box 78, if the canopy temperature key 30b had been pressed instead of the air temperature/humidity key 30c, branch 83 is taken to the input/output box 80 immediately to take crop canopy temperature measurements. At box 80, a message is displayed which instructs the operator to press the canopy temperature key when he is ready to take a canopy temperature measurement in the field. At this time, the operator carrying the unit will move to a position in the field at which a first canopy temperature measurement is to be taken and then properly aim the IR thermometer so that only crop is in its view. When the operator presses the canopy temperature key, a canopy temperature measurement is then obtained from the IR thermometer.

After the canopy temperature measurement is taken, the program proceeds to box 85 where solar radiation is measured by the radiation sensor 14. This first solar radiation measurement is then stored as a reference value for subsequent comparison with later solar radiation measurements as well as for subsequent analysis of acquired data received from the sensors and stored in the computer's memory. The program then proceeds to decision box 86 where a check is made to see if the crop canopy temperature measurement appears to be valid. By way of example, the crop canopy temperature measurement may be checked to determined if it is less than about 15° C. or greater than about 40° C. A crop canopy temperature measurement less than the lower limit may be indicative of the IR thermometer having been aimed at the sky whereas a measurement greater than the upper limit may be indicative of the sensor having viewed the soil. If the canopy temperature measurement falls outside these limits, the program takes branch 87 to box 80 for re-taking the crop canopy temperature measurement.

If the crop canopy temperature measurement is within such limits and thus appears to be valid, the program proceeds to decision box 90 where a check is made to determine if solar radiation has changed significantly since the first canopy temperature measurement was taken. As above noted, the first solar radiation measurement is used as a reference and a check may be made to see if the just taken solar radiation measurement is within about 25% of the reference value. If the check indicates a significant change in solar radiation, a message is displayed at box 91 advising the operator of this and instructing him to wait until conditions have stabilized (as when there will be an extended period of clear sky or cloud cover) and then to reset the machine. If no significant change has occurred, i.e., the instant solar radiation measurement is within about 25% of the reference value, the program proceeds to box 92. As a result of this check, the canopy temperature measurements to be used for analysis will all have been taken under generally similar solar radiation conditions. For the first taken canopy temperature measurement, the solar radiation measurement of course will be equal the reference value, the former being used to set the latter. Accordingly, the program will then proceed to box 92.

At box 92, the canopy temperature measurement is stored in the computer's memory for later analysis and optionally in a data storage device such as the cassette recorder if desired. Proceeding on to box 93, a counter indicative of the number of temperature measurements that have been taken is incremented and then in box 94 a check is made to see if a predetermined number of canopy measurements have been taken, 30 for example. If an additional canopy temperature measurement or measurements are to be taken, the program takes loop 95 back to box 80 for taking of another canopy temperature measurement. The program will then continue to loop in this manner until the required number of crop canopy temperature measurements are taken at different locations in the field. After the required number of crop canopy temperature measurements have been taken, the program then proceeds from box 94 to decision box 98. At decision box 98, a check is made to see if air temperature/humidity measurements have been taken. If not, the program proceeds to box 99 for taking such measurements in the manner above described. If air temperature/humidity measurements were previously taken, the program proceeds directly to the calculation sub-program shown in FIG. 4B.

It is here noted that the calculations or analysis performed by the calculation sub-program and the decision criteria used in the decision sub-program for recommending or not recommending irrigation will be such that it will vary from crop to crop and perhaps also from region to region. Accordingly, only representative calculations and decision criteria will be described as for use in scheduling the irrigation of corn, it being understood that the program may be easily changed to carry out different calculations for use with different decisional criteria to give successful results for a particular crop and/or particular region. Generally, however, the subject invention contemplates decision criteria based on the water stress condition of the crop which embodies the hereinafter discussed plant water stress factors, while the specific criteria utilized falls without the scope of the subject invention.

At block 102 in FIG. 4B, the average and standard deviation of the canopy temperature measurements acquired in the foregoing manner are calculated whereas in blocks 103-105, three indices of plant water stress are calculated. The index calculated in box 103 is related to the stress degree day index reported in the above noted Idso et al (1977) paper. Such index, herein denoted I1, is the difference between average canopy temperature and ambient air temperature, i.e., $$I1 = \overline{T}_c - T_a$$

where $\overline{T}_c$ is average canopy temperature and $T_a$ is the ambient air temperature or dry bulb temperature measured by the psychrometer. The index calculated in block 104 is related to the water stress index reported in the above noted Idso et al (1981) paper. Such index, herein denoted I2, is calculated according to the equation:

$$I2 = (I_1 - D2)/(D1 - D2)$$

where D1 is the approximate maximum value of I1 that is expected under water stress conditions and D2 is the minimum value of I1 expected under well watered conditions. For corn, present calculations indicate a constant value of about 3 for D1 and D2 = 2.67 − 2.059*VPD where VPD is the vapor pressure deficit. The third index calculated in block 105 is related to the crop water stress index reported in the above noted Jackson et al (1981) paper. Such index, herein denoted I3, is a function of the first index, vapor pressure deficit and solar radiation as represented by the equation:

$$I3 = (I1 - D4)/(D3 - D4)$$

with $$D3 = \frac{r_a R_n}{\rho c_p}$$

and $$D4 = \frac{r_a R_n}{\rho c_p} * \frac{\gamma}{\Delta + \gamma} - \frac{VPD}{\Delta + \gamma}$$

where $r_a$ equals the aerodynamic resistance of the crop which in the absence of a wind speed sensor may be assumed to be 5.0, $R_N = 0.79 * RAD$ where RAD is the value of the solar radiation sensor output, $\rho$ is the density of air $(1.287491 - 4.035152(10^{-3})*T_a$, $c_p$ is the heat capacity of air (1006.0), $\gamma$ is the psychrometric constant $(64.54859 + 0.06472303*T_a$, and $\Delta$ is the slope of the saturated air vapor pressure curve $(44.869255 + 2.837391*T_a + 0.068165 - *T_a^2 + 1.937586(10^{-3})*T_a^3$. Respecting $r_a$, provision may be made for entry of actual wind speed data.

Referring now to FIG. 4C, the results of the foregoing calculations are then compared to preselected values to derive irrigation instructions. The criteria indicated in blocks 110-114 is representative of a criteria which may find successful use in the scheduling of irrigation of corn.

At block 110, a check is made to see if I2 exceeds 0.2, or a value of about 0.2, which indicates that the crop in general is water stressed. If I2 exceeds such value, the program proceeds to box 115 where an appropriate instruction to irrigate is displayed on the liquid crystal display 12. If I2 is not greater than such value, such indicating that the crop generally is not in need of irrigation, the program proceeds to box 111 where the standard deviation of crop canopy temperature (SDCT) is checked to see if it exceeds 1.5, or a value of about 1.5, which indicates that the crop in some parts of the field is water stressed. If SDCT exceeds this value, the program proceeds to box 116 where an appropriate instruction to irrigate is displayed preferably with added indication that the crop is generally not in need of irrigation but that the crop in some parts of the field is water stressed.

If SDCT does not exceed 1.5, the program proceeds to box 112 where a check is made to see if I1 is greater than −2.0, or a value of about −2.0. I1 is a less significant indicator of crop water stress than I2 but provides further assurance that the crop will be irrigated even though the I2 index does not indicate a need for irrigation. If the criterion set forth in box 112 is met, the program proceeds to box 117 where an appropriate instruction to irrigate is displayed preferably with appropriate qualification indicating that the I2 and SDCT criteria do not indicate irrigation. Given this information, the operator could then make an informed decision to irrigate or not to irrigate.

If the criterion in box 112 is not satisfied, the program proceeds to box 113 where the average canopy temperature is checked to see if it exceeds 36° C., or a value of about 36° C., which means that the crop is quite hot and subject to thermal strain. If such criterion is met, the program proceeds to block 118 where a message is displayed indicating that irrigation is recommended to reduce thermal stress in the crop.

If the criterion of box 113 is not satisfied, the program proceeds to box 114 where I3 is checked to see if it exceeds 0.60, or a value of about 0.60. If the criterion of box 114 is met, the program proceeds to box 119 for display of an instruction to irrigate preferably with qualifying information such as an indication that all other decision criteria do not indicate a need to irrigate. If the criterion of box 114 is not met, the program proceeds to box 120 where a message is displayed indicating that the crop is not in need of irrigation.

As will be appreciated, the above described system and related method according to the invention will greatly facilitate the collection of crop water stress data and then immediately analyze and derive from such data irrigation instructions for controlling irrigation of the agricultural area in accordance therewith. The irrigation instructions may be provided with appropriate qualifying remarks to enable the operator to make a final and informed decision whether to irrigate or not to irrigate. Of course, the operator in making the final decision can consider other factors such as whether or not rain is being forecast, a weather forecast conveniently being obtained by pressing the radio key 33. On the other hand, the operator could, if desired, rely solely upon the irrigation instructions outputted by the system and turn on the irrigation equipment essentially automatically when so instructed.

Figure 5:
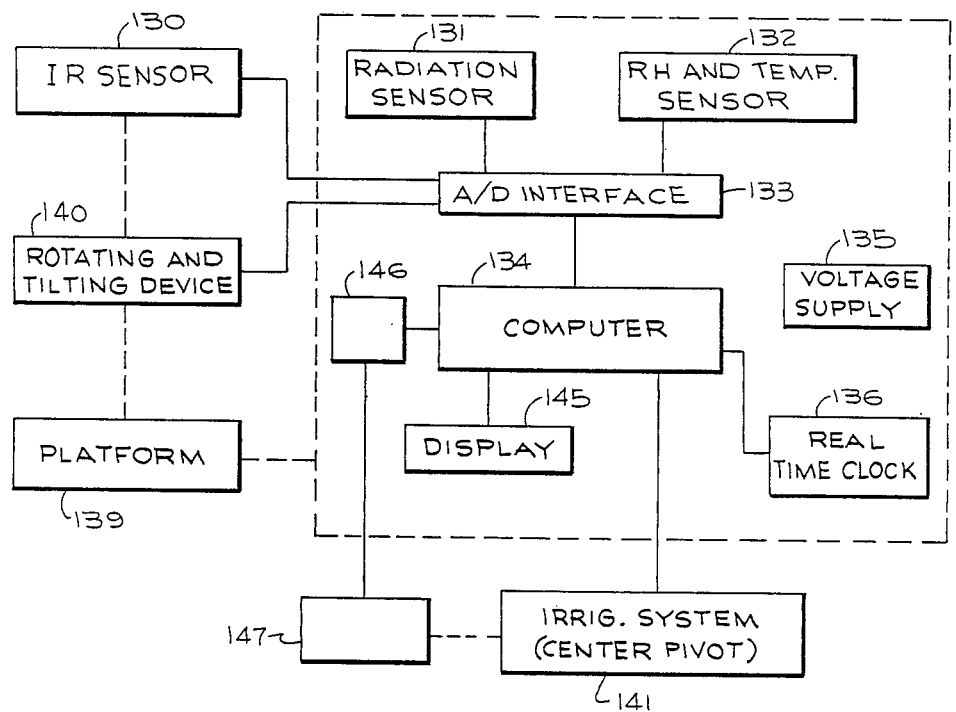
FIG. 5 is a block diagram of another irrigation scheduling system embodiment according to the subject invention.

Referring now to FIG. 5, another embodiment of an irrigation system according to the invention is illustrated. Like the above described system, the FIG. 5 system includes a crop canopy temperature sensor 130, a solar radiation sensor 131 and an air temperature/relative humidity sensor 132. The sensors 130–132 are operatively connected via an analog-to-digital interface 133 to a digital device such as a computer 134. Also provided is a source of electrical power such as a battery 135 for powering the system components, and a real time clock 136.

The crop canopy temperature sensor 130 preferably is an infrared thermometer such as that above noted for example. The IR thermometer is mounted on an elevated support 139 preferably at or near the center of the agricultural area under consideration and a motorized rotating and tilting device 140 is provided to control the horizontal and azimuth angle of the IR thermometer. The elevated support may be a platform of sufficient height to locate the IR thermometer above the crop canopy. If the agricultural area is irrigated by a center pivot sprinkling system 141, the IR thermometer preferably is mounted atop the center pivot structure. The other sensors also may be mounted to the platform or center pivot structure and likewise the other system components in an environmentally sealed housing to protect against environmental conditions. The housing also should include lightning protection.

Preferred operation of the system embodiment illustrated in FIG. 5 is as follows. At a preselected time each day, such as 1500 hours, the real time clock 136 turns on the computer 134 which, according to a program included therein, obtains temperature and humidity measurements from the sensor 132. The computer then turns on the device 140 that controls the horizontal and azimuth angles of the IR thermometer 130 so that canopy temperature measurements can be obtained at respective different locations in the field as the infrared thermometer scans a circle.

Each canopy temperature measurement may be checked to determine if it appears valid, i.e., between about 15° C. and about 40° C. If outside of this range, the canopy temperature measurement is rejected. Also, solar radiation may be measured by the radiation sensor 131 each time a canopy temperature measurement is taken, and the first taken solar radiation measurement may be stored as a reference value. Each time a canopy temperature measurement is taken, a check may be made to determine if solar radiation has changed significantly since the first canopy temperature measurement was taken. If the check indicates a significant change in solar radiation, e.g., the instant solar radiation measurement is outside of about 25% of the reference value, the data collection procedure is re-initiated. Otherwise, the foregoing procedure continues until the IR thermometer 130, for example, has scanned a complete circle from the time the data collection was initiated or re-initiated in the case of a significant change in solar radiation.

Any suitable means may be utilized to implement the foregoing automatic collection of data under the control of the computer.

After the computer 134 has completed such automatic collection of data from the sensors 130–132, it then processes such data, as in accordance with the aforedescribed calculation and decision sub-programs (FIGS. 4B and 4C) to obtain a recommendation respecting irrigation. If irrigation is indicated, the computer may output an appropriate command signal initiating automatic operation of the irrigation system 141 employed in the agricultural area which may then operate for a predetermined amount of time or, by way of further example, for a computer determined time based on the severity of plant water stress determined as a function of the measurement data obtained from the sensors.

Alternatively, the computer may output an appropriate instruction to an operator such as an alarm which may be coupled with a message on a liquid crystal display 145 operatively connected to the computer. The computer may also be provided with a communication device 146 for transmitting the irrigation instructions to a remote receiving device 147 located, for example, at an irrigation control station where the irrigation system may be turned on by the farmer. If desired, the collected data may be stored and/or transmitted for further analysis.

Although the invention has been shown and described with respect to preferred embodiments, it is obvious that equivalent alterations and modifications will occur to other skilled in the art upon the reading and understanding of this specification. The present invention includes all such equivalent alterations and modifications, and is limited only by the scope of the following claims.

We claim:

1. An apparatus for indicating water stress of a growing agricultural crop comprising:

sensor means for sensing a plurality of parameters related to a growing crop from which the water stress condition of the crop can be determined and for generating a plurality of sensor signals respectively representative of the sensed parameters, said sensor means including an infrared thermometer for sensing crop canopy temperature and solar radiation sensor means for sensing the intensity of incident solar radiation;

electronic means, operatively connected to said sensor means, for controllably receiving the sensor signals from said sensor means, and for deriving therefrom at least one index of the water stress condition of the crop, said electronic means including means for receiving solar radiation intensity measurements, means for comparing a said solar radiation intensity measurement to a range of solar radiation intensities including a reference intensity to determine if said solar radiation intensity measurement is within said range, and means for rejecting a canopy temperature measurement if the solar radiation intensity measurement is outside the range;

input means, operatively connected to said electronic means, for selective control by a human operator of the receipt of said sensor signals from said sensor means; and output means, operatively connected to said electronic means, for visually displaying said at least one index to an operator of said apparatus.

2. The apparatus set forth in claim 1, wherein said sensor means includes means for sensing relative humidity and for sensing ambient air temperature.

3. The apparatus set forth in claim 1, wherein said electronic means includes a programmable computer for analyzing and deriving at least one index of water stress from the sensor signals according to predetermined decision criteria for the crop being grown.

4. The apparatus set forth in claim 1, wherein said output means includes means for automatically controlling irrigation equipment in response to the derived index of water stress condition.

5. A portable apparatus for indicating water stress of an agricultural crop being grown in a field, said apparatus comprising;

a housing;

a plurality of sensor means, at least some of said sensor means carried by said housing, for sensing a plurality of parameters related to a crop growing in a field from which the water stress condition of the crop can be determined and for generating a plurality of sensor signals respectively representative of the sensed parameters, said sensor means including an infrared thermometer for sensing crop canopy temperature and solar radiation sensor means for sensing the intensity of incident solar radiation;

electronic means, mounted in said housing and operatively connected to said sensor means, for controllably receiving the sensor signals from said sensor means, and for deriving therefrom in said field at least one index of the water stress condition of the crop, said electronic means including means for receiving solar radiation intensity measurements, means for comparing a said solar radiation intensity measurement to a range of solar radiation intensities including a reference intensity to determine if said solar radiation intensity measurement is within said range, and means for rejecting a canopy temperature measurement if the solar radiation intensity measurement is outside the range;

input means carried by said housing and operatively connected to said electronic means, for selective control by a human operator of the receipt of said sensor signals from said sensor means; and output means, carried by said housing and operatively connected to said electronic means, for visually displaying said at least one index to said operator in said field.

6. The apparatus set forth in claim 5, comprising an extension pole mounted at its lower end to said housing and supporting at its upper end said infrared thermometer at a substantially higher elevation than said housing.

7. The apparatus set forth in claim 6, wherein said extension pole is adjustable in length.

8. The apparatus set forth in claim 6, comprising strap means for enabling said housing to be carried by said operator.

9. The apparatus set forth in claim 5, wherein said sensor means includes temperature and humidity sensor means for sensing ambient air temperature and relative humidity in said field.

10. The apparatus set forth in claim 9, wherein said temperature and humidity sensor means is located within said housing, said housing including door means operable to expose said temperature and humidity sensor means to outside environmental conditions when said door means is opened.

11. The apparatus set forth in claim 10, comprising switch means operated by said door means for actuating said temperature and humidity sensor means when the door is opened.

12. The apparatus set forth in claim 5, wherein said electronic means includes a programmable computer for analyzing and deriving at least one index of water stress from the sensor signals according to predetermined decision criteria for the crop being grown.

13. A method for determining the water stress condition of an agricultural crop being grown in a field, comprising the steps of:

sensing a plurality of different parameters related to a crop growing in a field from which the water stress condition of the crop can be determined including the intensity of incident solar radiation and the crop canopy temperature, at a plurality of different locations in the field;

generating sensor signals representative of each of the sensed parameters;

supplying said signals to an electronic device operatively connected to the sensors, comparing the sensed solar radiation intensity to a range of solar radiation intensities including a reference intensity, rejecting the crop canopy temperature measurement if the sensed solar radiation intensity is outside the range and, if the sensed solar radiation intensity is within the range, calculating with said electronic device in said field from said signals at least one index of the water stress condition of the crop; and visually displaying to a human in said field the at least one calculated water stress index.

14. The method of claim 13 including measuring the air temperature and relative humidity in said field at a plurality of locations in said field and calculating, as a water stress index for the field, at least one of: (i) the average crop canopy temperature; (ii) the standard deviation of the crop canopy temperatures; (iii) the average difference between the air and crop canopy temperatures; and (iv) the difference between the air and crop canopy temperatures as a portion of the maximum difference expected at the measured water vapor pressure deficit.

* * * * *